Oct. 6, 1964 G. H. DYRDAHL 3,151,429

SELF-PROPELLED SWATHER

Filed Jan. 6, 1961 4 Sheets-Sheet 1

INVENTOR.
GORDEN H. DYRDAHL
BY
Merchant & Merchant
ATTORNEYS

INVENTOR.

GORDEN H. DYRDAHL

BY

Merchant & Merchant

ATTORNEYS

Oct. 6, 1964 G. H. DYRDAHL 3,151,429
SELF-PROPELLED SWATHER
Filed Jan. 6, 1961 4 Sheets-Sheet 3
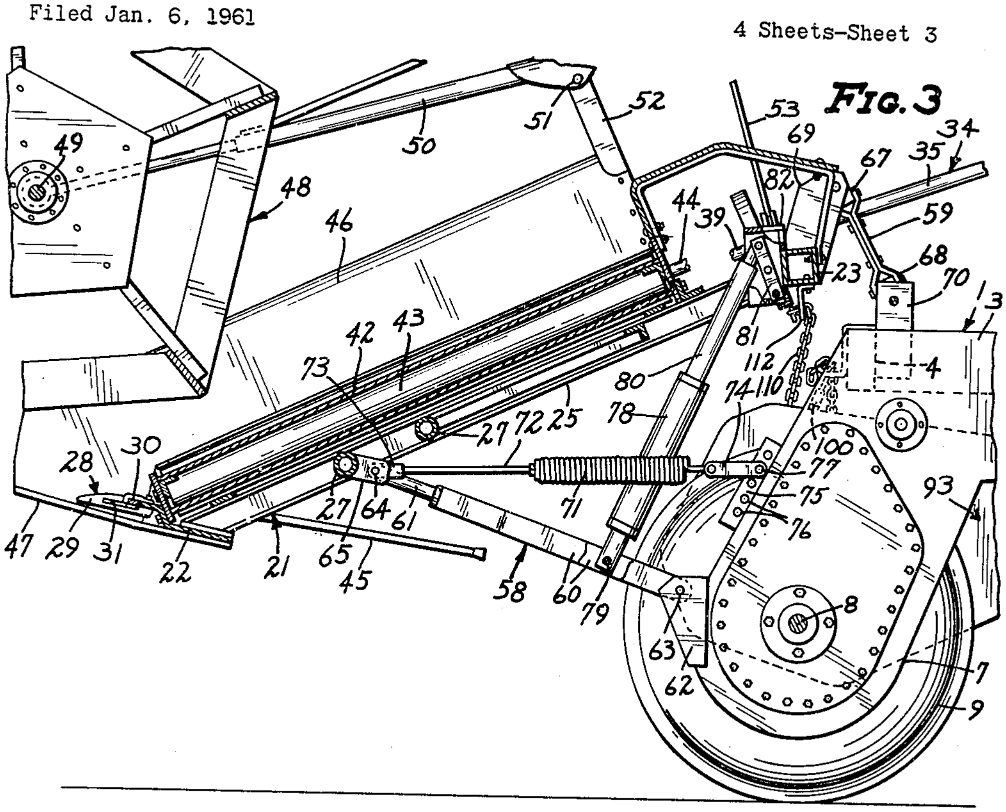
FIG. 3
FIG. 4
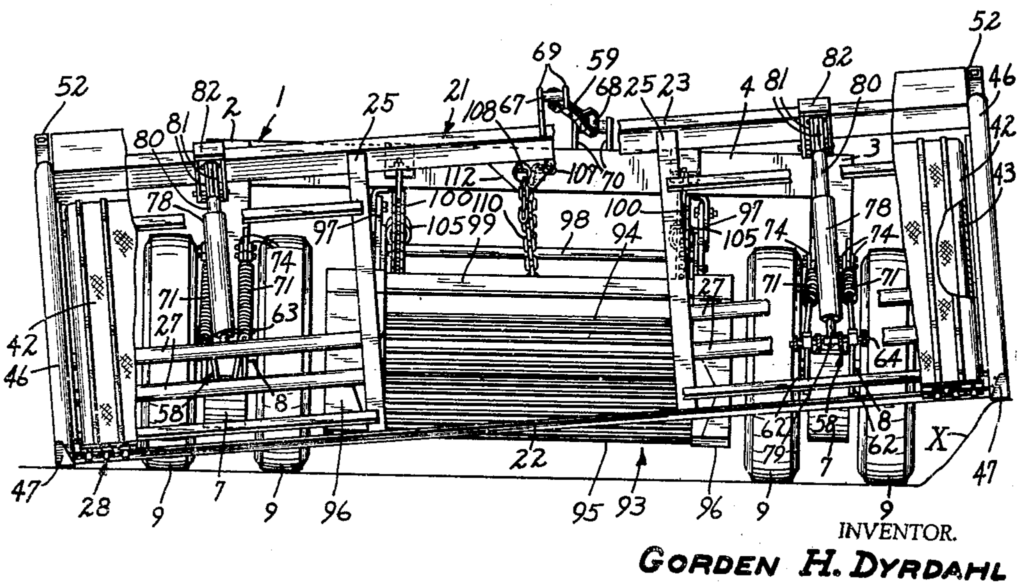
INVENTOR.
GORDEN H. DYRDAHL
BY
Merchant & Merchant
ATTORNEYS Oct. 6, 1964 G. H. DYRDAHL 3,151,429

SELF-PROPELLED SWATHER

Filed Jan. 6, 1961 4 Sheets-Sheet 4

INVENTOR.
GORDEN H. DYRDAHL
BY
Merchant & Merchant
ATTORNEYS

United States Patent Office 3,151,429
Patented Oct. 6, 1964

1

3,151,429
SELF-PROPELLED SWATHER

Gorden H. Dyrdahl, Owatonna, Minn., assignor to Owatonna Manufacturing Company, Inc., Owatonna, Minn., a corporation of Minnesota Filed Jan. 6, 1961, Ser. No. 81,065
8 Claims. (Cl. 56—23)

My invention relates generally to swathers, and more particularly to swathers of the self-propelled type used for cutting ripened field crops and arranging the same in windrows.

An important object of my invention is the provision of a swather, having a mower and a crop conveyor for forming windrows, in which the mower will easily follow the contour of the ground traversed. To this end I provide a wheel mounted mobile frame structure, a windrower, and novel means mounting the windrower to the mobile frame structure for generally vertical movements of each end of the windrower independently of the opposite end thereof.

Another object of my invention is the provision of a swather as set forth, having counterbalancing means whereby very little effort is needed to raise either end of the windrower, so that, when one end or the other of the windrower encounters a rise in terrain, that end portion of the windrower will be elevated to prevent the mower from digging into the ground.

Another object of my invention is the provision of a swather of the above type having novel means for bodily raising and lowering the windrower, while permitting said raising and lowering of each end thereof independently of the other thereof whereby the field crop may be cut at a desired height above ground level.

Still another object of my invention is the provision of means including a pair of laterally spaced arms for mounting a windrower on a mobile frame structure for independent generally vertical movements of opposite end portions of the windrower, said arms being of novel construction permitting said independent movements without binding.

Another object of my invention is the provision of a swather as set forth, which is relatively simple and inexpensive to produce, which is highly efficient in operation, and which is rugged in construction and durable in use.

The above, and still further highly important objects and advantages of my invention will become apparent from the following detailed specification, appended claims and attached drawings.

Referring to the drawings, which illustrate the invention, and in which like reference characters indicate like parts throughout the several views:

FIG. 3 is a view corresponding to a portion of FIG. 2, but showing a different position of some of the parts;

FIG. 4 is a view in front elevation, some parts being broken away and some parts removed, and showing the windrower of my invention in a tilted position;

2

Figure 1:
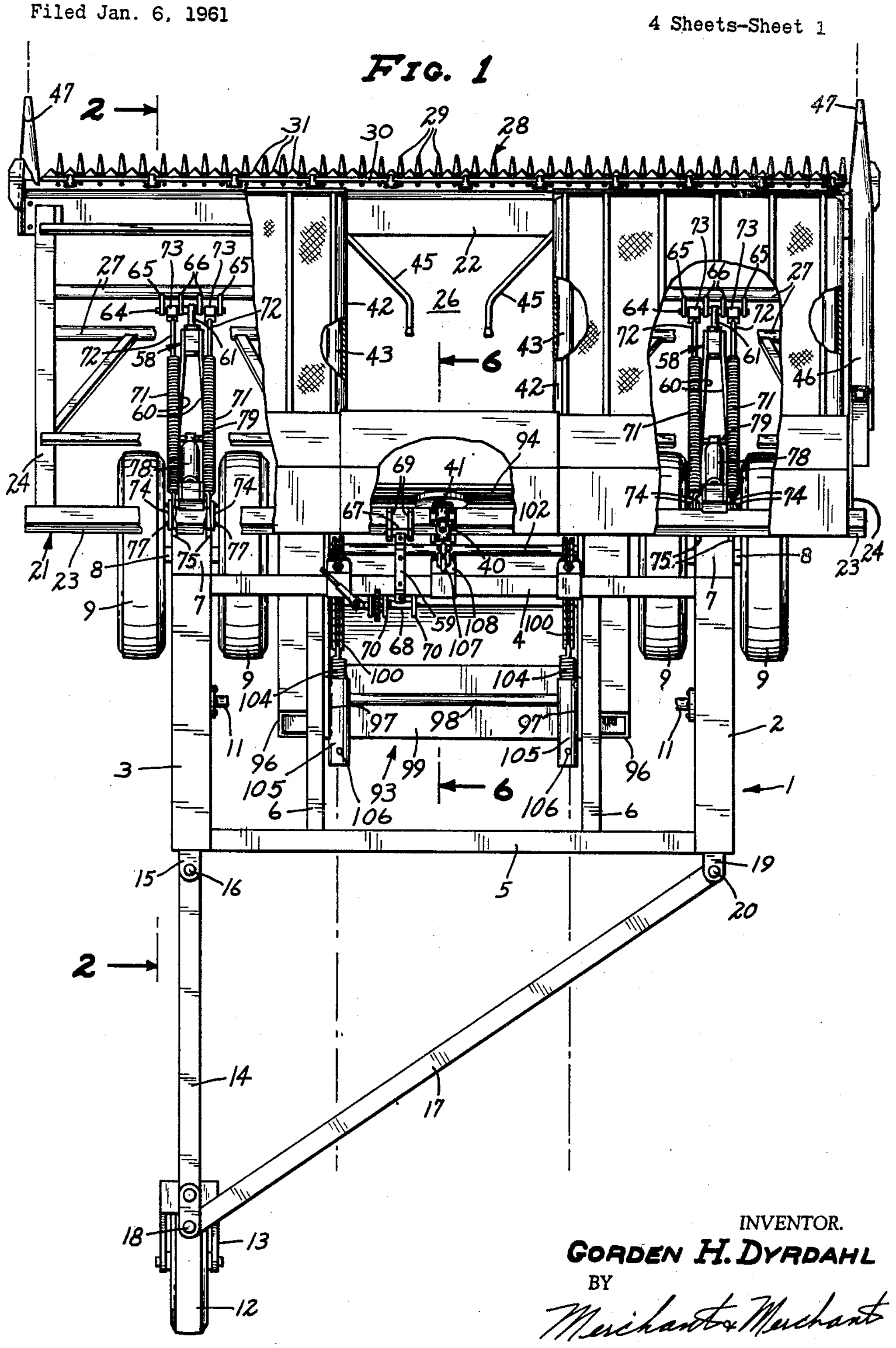
FIG. 1 is a view in plan of a self-propelled swather made in accordance with my invention, some parts being broken away and some parts being removed.

In the preferred embodiment of the invention illustrated, the numeral 1 indicates, in its entirely, a generally rectangular mobile frame structure, comprising laterally spaced parallel side frame members 2 and 3, front and rear cross frame members 4 and 5 respectively and laterally spaced parallel intermediate frame members 6 connected at their front and rear ends to the front and rear cross frame members 4 and 5 respectively. The side frame members 2 and 3 are formed to provide depending portions 7 at their front ends, in which are journalled aligned axles or shafts 8 on which are mounted pairs of pneumatic tire equipped drive wheels 9. The side frame members 2 and 3 are preferably hollow, and contain power transmission mechanism, not shown, for driving the wheels 9 from a suitable source of power, not shown, but which may be assumed to be contained within a housing 10 mounted on the frame 1, see FIG. 5. A power transmission shaft for driving the wheels 9 is shown fragmentarily in FIG. 1, and indicated at 11. Suitable means for driving the wheels 9 are shown and described in detail in the United States Letters Patent 2,677,225 to Julius Ommodt, reference being had thereto.

The rear end of the frame structure 1 is supported by a caster wheel 12 journalled in a fork 13 that is pivotally mounted to the rear end portion of a rearwardly extending bar 14 pivotally secured to a bracket 15 at the rear end of the side frame member 3, as indicated at 16. A diagonal brace member 17 is pivotally secured at one end to the rear end of the bar 14, as indicated at 18, and at its opposite end to a bracket 19 similar to the bracket 15, as indicated at 20, the bracket 19 being similar to the bracket 15 and being welded or otherwise rigidly secured to the rear end of the side frame member 2, see FIG. 1. The arrangement is such that, if desired, the bar 14 may be pivotally secured to the bracket 19, with the diagonal members 17 being pivotally secured at its front end to the bracket 15. With this arrangement, the caster wheel 12 will be disposed directly behind the side frame member 2. The bar 14, as well as the diagonal member 17 and the several members making up the frame structure 1, are preferably made from structural steel, the several components of the frame structure 1 preferably being welded together.

The front end of the frame 1 supports a windrower comprising a generally rectangular windrower frame 21 that is elongated in a direction transversely of the direction of travel of the frame 1, and which comprises transverse front and rear frame members 22 and 23, the former of which is in the nature of an elongated plate-like bar and the latter of which is a cross-sectionally rectangular tube, parallel outer cross frame members 24 connecting opposite end portions of the front and rear frame members 22 and 23, and spaced parallel inner cross frame members 25 in inwardly spaced parallel relation to the outer cross frame members 25, the members 25 defining opposite sides of a discharge opening 26. The frame 21 further includes tubular brace members 27 that extend longitudinally of the frame 21 in rearwardly spaced relation to the front frame member 22, the brace members 27 being welded or otherwise secured at their opposite ends to the outer and inner cross frame members 24 and 25 respectively.

A front frame member 22 provides a support for a mower, indicated generally at 28, that extends longitudinally of the windrower frame 21 and comprises the usual spaced guards 29, reciprocatory sickle bar 30 and sickle knives 31 mounted on the sickle bar 30 for common reciprocatory movements therewith. Reciprocatory movement is imparted to the sickle bar 30 by means of a rotary shaft 32, suitable gearing, not shown, but which may be assumed to be contained in a gear box 33, an extensible and retractable shaft 34 comprising telescoping shaft sections 35 and 36, and other well known power transmission connections, not shown. The shaft section 36 is connected to an output shaft 37 of the gear housing 33 by means of a universal joint 38, and the opposite end of the shaft section 35 is operatively connected to a short shaft 39 by means of a second universal joint 40, the shaft 39 being journalled in a bearing 41 bolted or otherwise rigidly secured to the central portion of the rear frame member 23. Other elements of the drive train for the sickle bar 30, being well-known to those skilled in the art and not in themselves comprising the instant invention, further showing and description thereof is omitted in the interest of brevity.

Figure 2:
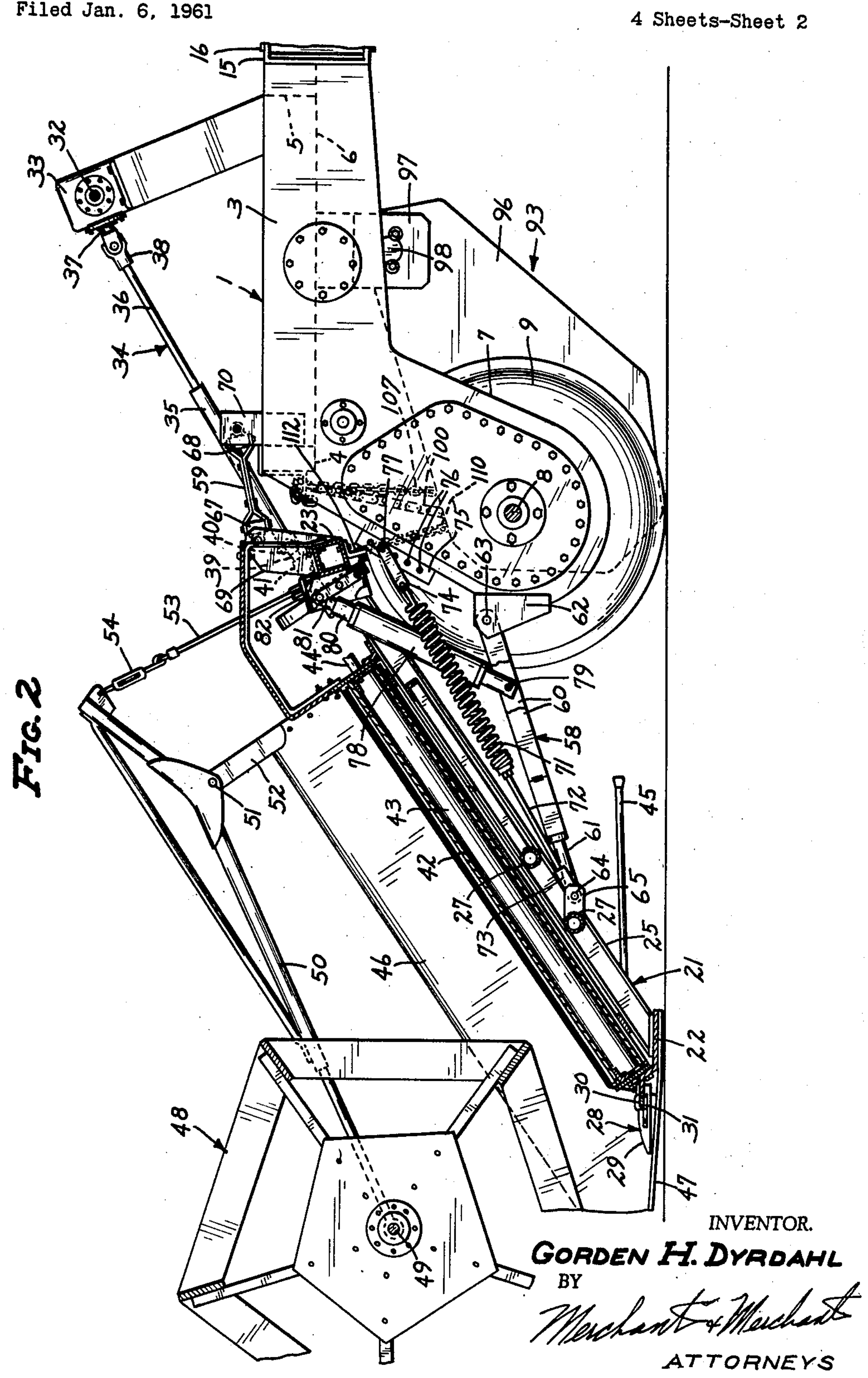
FIG. 2 is an enlarged fragmentary view, partly in side elevation and partly in section, taken substantially on the line 2—2 of FIG. 1.

A pair of endless belt conveyors 42 are entrained over the rollers 43 adjacent the outer end frame members 24 and inner frame members 25, the rollers 43 being suitably journalled in the windrower frame 21. At least one of the rollers 43 associated with each of the conveyors 42 is provided with a shaft 44, one of which is shown in FIGS. 2 and 3, the shafts 44 being operatively coupled to the shaft 39 by suitable and well known power transmission connections, not shown. It should suffice to state that the upper flights of the conveyor belts 42 are driven in opposite directions whereby material cut by the mower 28 and received on the belt conveyors 42 will be delivered to the central discharge opening 26 and deposited therethrough to form a windrow on the ground. A pair of guide fingers 45 projecting angularly inwardly and rearwardly from the front portion of the windrower frame 21 within the discharge opening 26 aid in forming the windrow as the machine progresses over a field.

Figures 5, 6, 7:
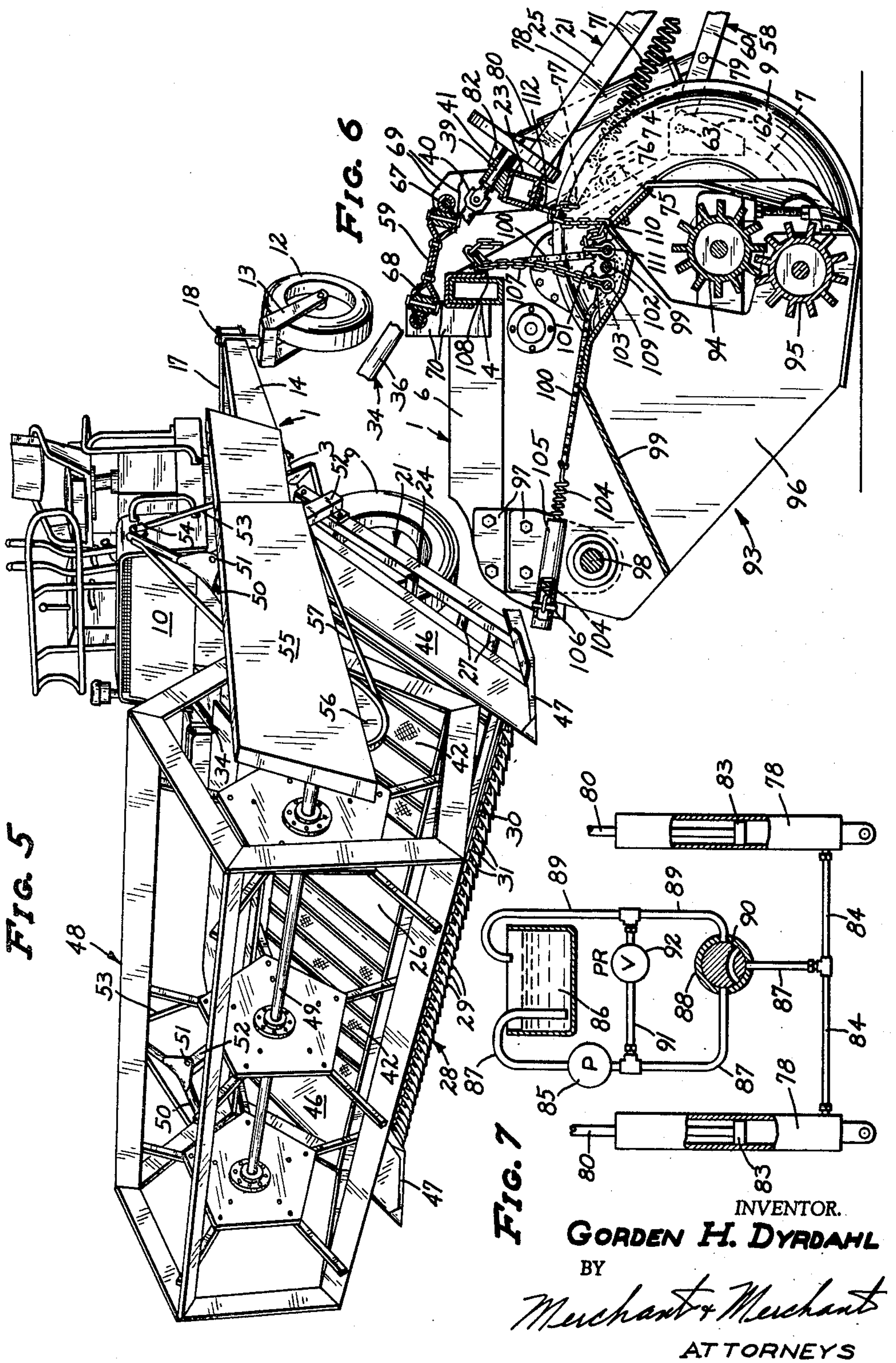
FIG. 5 is a view in perspective of the self-propelled swather of my invention.
FIG. 6 is an enlarged fragmentary view in transverse section, taken substantially on the line 6—6 of FIG. 4.
FIG. 7 is a schematic diagram illustrating a preferred arrangement for raising and lowering the windrower of my invention.

A pair of end shields 46 are mounted to the opposite ends of the windrower frame 21 and terminate at their front ends in guide shoes 47 that are adapted to engage high spots in the terrain being traversed by the machine to raise one end or the other of the windrower to prevent the mower 28 from digging into the ground. A conventional reel 48 is mounted on a shaft 49 in overlying spaced generally parallel relation to the front end of the windrower frame 21 and the mower 28, the shaft 49 being journalled in suitable bearings in the front ends of a pair of supporting arms 50 that are pivotally secured, as indicated at 51, to the upper ends of legs 52 which extend upwardly from the rear longitudinal edge of the windrower frame 21 at the opposite ends thereof. The reel 48 is held in upwardly spaced relation to the front end of the windrower frame 21 by anchoring cables or the like 53 suitably connected to the rear window or frame member 23 and to the rear ends of the arms 50 by turnbuckles or the like 54, by means of which the spacing between the reel 48 and the mower 28 may be adjusted. With reference to FIG. 5, it will be seen that a guard plate 55 covers a portion of power transmission means for imparting rotation to the reel 48 in a direction to sweep the cut field crop from the mower 28 rearwardly to the conveyor belts 42 and into the discharge opening 26. The power transmission mechanism for rotating the reel 48 is conventional, only a portion thereof including a pulley 56 and a belt 57 entrained thereover, being partially shown in FIG. 5.

With reference to FIGS. 2, 3 and 5, it will be seen that the plane of the windrower frame 21 and the conveyor belts 42 inclines rearwardly and upwardly from the mower 28. Means for mounting the windrower frame 21 to the front end of the mobile frame structure 1 comprises a pair of laterally spaced generally parallel mounting elements in the nature of rigid arms 58 and a rigid link 59. The arms 58 each comprise a bifurcated rear arm section 60 and a front arm section 61 that is pivotally connected to the rear arm section on an axis extending longitudinally of its respective arm 58. Each rear arm section 60 is pivotally secured between bracket members 62 projecting forwardly from the depending portions 7 of adjacent side frame members 2, as indicated at 63, for swinging movements on a horizontal axis extending transversely of the direction of travel of the machine. The front ends of the front arm sections 61 are pivotally connected to aligned shaft 64 parallel to the axes of the pivotal connections 63, the shafts 64 being mounted in the outer end portions of longitudinally spaced outer and inner pairs of lugs 65 and 66 respectively, the inner ends of the lugs 65 and 66 being welded or otherwise rigidly secured to adjacent ones of the tubular brace members 27, see particularly FIG. 1. The front ends of the front arm sections 61 are disposed between the inner lugs 66 of each pair thereof. At its front and rear ends, the rigid link 59 is provided with respective universal joints 67 and 68, the former of which is connected to a pair of spaced parallel upstanding brackets 69 rigidly connected to the central portion of the rear windrower frame member 23. A universal joint 68 is operatively connected to the mobile frame structure 1 by a pair of upstanding brackets 70 that are welded or rigidly secured to the front frame member 4 and which extend upwardly therefrom. The above described arrangement of the arm 58 and links 59 mount the windrower frame 21 and parts carried thereby, to the mobile frame structure 1 in such manner that either end of the windrower may be elevated independently of the opposite ends thereof. Thus, when one of the guide shoes 47 encounters a rise in the terrain traversed by the machine, the adjacent end of the windrower will be elevated while the opposite end of the windrower will remain at ground level as shown in FIG. 4. In FIG. 4, the reference character X indicates an irrigation border or like obstruction, the windrower mounting arrangement permitting the machine to travel along one side of the irrigation ditch, and to mow and windrow any field crops which may be growing on the irrigation border X.

For the purpose of counterbalancing the weight of the windrower, so that the same may be easily moved upwardly and downwardly relative to the mobile frame structure 1, I provide a plurality of coil tension springs 71 that are connected to the shafts 64 between adjacent lugs 65 and 66 by coupling rods 72 and connector bars 73. At their rear ends, the springs 71 are connected to anchoring links 74 that are pivotally connected to anchoring brackets or the like 75 welded or otherwise rigidly secured to the front ends of the depending portions 7 of adjacent side frame members 2. The brackets 75 are each provided with a plurality of mounting apertures 76, the anchoring links 74 being selectively positioned with respect to their adjacent brackets 75 by mounting pins or the like 77 which are adapted to be received in selected ones of the apertures 76. With reference particularly to FIGS. 2 and 3, it will be noted that the counterbalancing springs 71 are angularly displaced with respect to the longitudinal dimension of the mounting arms 58 so that, by shifting the anchoring links 74 longitudinally of their respective anchoring brackets 75, the bias of the springs 71 may be varied, if desired.

A pair of fluid pressure cylinders 78 are pivotally secured at their lower ends to the rear end portions of the bifurcated arm sections 60, as indicated at 79, the cylinders 78 being provided with cooperating extensible and retractable piston plunger elements 80, the upper ends of which are pivotally connected to selected portions of mounting bars 81 that are welded or otherwise secured to mounting brackets 82 on the rear windrower frame member 23. With reference to the diagram of FIG. 7, it will be seen that the plunger elements 80 are provided with the usual pistons 83 within the cylinders 78, and that the lower ends of the cylinders 78 are directly connected by a conduit 84. Fluid under pressure is introduced to the lower ends of the cylinders 78 through the conduit 84 from a fluid pressure pump 85 which receives fluid from a reservoir 86, the pump 85 being interposed in a conduit 87, one end of which communicates with the reservoir 86, and the other end of which is connected to the conduit 84. A control valve 88 is interposed in the conduit 87 between the pump 85 and the conduit 84, and a return conduit 89 extends from the control valve 88 to the reservoir 86. The control valve 88 is provided with a passage 90 that is adapted to effect communication between the pump 85 and the cylinders 78, to connect the cylinders 78 to the return conduit 89, or to sever connections between the cylinders 78 and the pump 85 and return line 89, as shown in FIG. 7. A by-pass conduit 91, provided with a pressure relief valve 92 is connected to the conduit 87 between the pump 85 and valve 88, and to the return conduit 89, to prevent overloading of the pump 85. By introducing fluid under pressure to the cylinders 78, the windrower frame 21 and parts carried thereby may be raised to any desired elevation above the ground to mow the field crop at any desired height, or for the purpose of transporting the machine from one field to another. The arrangement is such that, in most positions of the windrower frame from its lowermost position of FIG. 2 upwardly, either end of the windrower may be elevated independently of the other end thereof as hereinbefore described.

A crop conditioning device, indicated generally at 93, comprises a pair of intermeshing toothed or vaned upper and lower rotor elements 94 and 95 respectively disposed generally below the rear windrower frame element 23 and behind the discharge opening 26 of the windrower, the axes of the rotor elements extending transversely of the direction of movement of the machine. The rotor elements 94 and 95 are journalled at their opposite ends in laterally spaced parallel supporting legs 96 that are generally parallel to the side frame members 2 and 3 and intermediate frame member 6, the legs 96 being pivotally mounted at their upper rear ends to supporting brackets 97, by means of a mounting shaft 98. The legs 96 are preferably connected by a guard plate or shield 99 that is welded or otherwise rigidly mounted at its opposite ends to the legs 96 whereby to provide a rigid structure. The upper rotor element 94 is driven in a clockwise direction with respect to FIG. 6, and the lower rotor element 95 is rotated in a counterclockwise direction, by conventional drive means, not shown, but preferably including the shaft 98. During movement of the machine over a field, the lower rotor 95 picks up the cut crop from the windrow from whence the crop material is fed between the rotor elements 94 and 95 and redeposited upon the ground rearwardly thereof. The front end of the crop conditioner 93 is floatingly suspended from the mobile frame structure 1 by a pair of laterally spaced link chains 100 that are anchored at one end to the front cross member 4, and which are entrained about a pair of sprocket wheels 101, one of which is shown, said sprocket wheels being mounted on a cross shaft 102 carried by legs 96. The opposite ends of the chains 100 are connected to respective ones of a pair of coil tension springs 104 that extend within mounting tubes 105 carried by the legs 96, the opposite ends of the springs 104 being hooked over anchoring pins 106 extending transversely through the rear end portions of the tubular members 105. A relatively heavy link chain 107 is connected at its upper end to a hook 108 on the front cross member 4, and at its lower end to a flange 103 on the guard plate 99, as indicated at 109, whereby to positively limit downward movement of the conditioner unit 93. A second lifting chain 110 is secured at its lower end to an anchoring pin or shaft 111, supported by one or both of the flanges 103, and at its upper end to a bracket member 112 bolted or otherwise rigidly secured to the intermediate portion of the windrower frame member 23. When the windrower is in its normal operative position adjacent the ground, the chain 110 is in a slack condition, as shown in FIG. 6. However, when the windrower is raised to its transport position of FIG. 3, the slack in the chain 110 is taken up and the conditioner 93 is raised to a transport position upwardly spaced a substantial distance from ground level.

The above machine has been thoroughly tested and found to be satisfactory for the accomplishment of the objectives set forth; and, while I have shown and described a commercial embodiment of my self-propelled swather, it will be understood that the same is capable of modification without departure from the spirit and scope of the invention as defined in the claims.

What I claim is:

1. A swather comprising, a frame structure having axially spaced supporting wheels journalled on a common fixed axis, a windrower including a normally horizontally disposed mower elongated in a direction transversely of the direction of travel of said frame structure and a conveyor disposed rearwardly of and generally parallel to said mower for receiving cut material from said mower and delivering said material in a direction longitudinally of the mower and depositing the material on the ground in a windrow, means including a pair of mounting elements connected to said windrower at longitudinally spaced points thereon mounting said windrower to said frame structure for generally vertical movements of each end portion of said windrower independently of the other end portion thereof and relative to the axis of said wheels, a pair of counterbalancing elements carried by said frame structure and operatively connected to longitudinally spaced points on said windrower for floatingly supporting the same, and means operatively connected to said windrower and said frame structure for bodily raising and lowering said windrower relative to the wheels of said frame while permitting said independent generally vertical movements of the opposite end portions thereof.

2. A swather comprising, a frame structure having axially spaced supporting wheels journalled on a common fixed axis, a windrower including a normally horizontally disposed mower elongated in a direction transversely of the direction of travel of said frame structure and a conveyor disposed generally rearwardly of said mower and generally parallel thereto for receiving cut material from said mower and delivering said material in a direction longitudinally of said mower and depositing said material on the ground in a windrow, means mounting said windrower on said frame structure for generally vertical movements of each end portion of said windrower independently of the other end portion thereof and relative to the axis of said wheels, said means comprising a pair of laterally spaced rigid arms pivotally connected at their opposite ends to said frame structure and to spaced points on said windrower toward the forward portion thereof, said means further including linkage pivotally connected to said frame structure and to the rear portion of said windrower, a pair of counterbalancing elements carried by said frame structure and operatively connected to longitudinally spaced points on said windrower for floatingly suspending said windrower, and means operatively connected to said windrower and said frame structure for bodily raising and lowering said windrower relative to said wheels while permitting said independent generally vertical movements of the opposite end portions thereof.

3. A swather comprising, a frame structure having axially spaced supporting wheels journalled on a common fixed axis, a windrower including a normally horizontally disposed mower elongated in a direction transversely of the direction of travel of said frame structure and a conveyer disposed generally rearwardly of said mower and generally parallel thereto for receiving cut material from said mower and delivering said material in a direction longitudinally of said mower and depositing said material on the ground in a windrow, means mounting said windrower on said frame structure for generally vertical movements of each end portion of said windrower independently of the other end portion thereof and relative to the axis of said wheels, said means comprising a pair of laterally spaced rigid arms pivotally connected at their opposite ends to said frame structure and to spaced points on said windrower toward the forward portion thereof, said rigid arms each comprising front and rear arm sections pivotally connected together for relative rotation on the longitudinal axis of their respective arm, said means further including linkage pivotally connected to said frame structure and to the rear portion of said windrower, a pair of counter-balancing elements carried by said frame structure and operatively connected to longitudinally spaced points on said windrower for floatingly suspending said windrower, and means operatively connected to said windrower and said frame structure for bodily raising and lowering said windrower relative to said wheels while permitting said independent generally vertical movements of the opposite end portions of said windrower.

4. The structure defined in claim 3 in which said linkage comprises a rigid link, a universal connection between one end of said link and said windrower centrally between the ends of said windrower, and a second universal connection between the opposite end of said link and said frame structure.

5. The structure defined in claim 3 in which said means for bodily raising and lowering said windrower comprises a pair of fluid pressure cylinder elements and cooperating extensible and retractable piston plunger elements, one of each pair of said elements being pivotally connected to a different one of said arms and the other of each pair of elements being operatively pivotally connected to said windrower in spaced relation to the connection of said arms to said windrower, and conduit means providing communication between said cylinder elements and a source of fluid pressure and providing direct communication between said cylinder elements.

6. The structure defined in claim 3 in further combination with guide shoes at opposite ends of said mower, said guide shoes being adapted to engage raised portions of the ground traversed by the swather to elevate their respective ends of said windrower.

7. A swather comprising, a frame structure having axially spaced supporting wheels journalled on a common fixed axis, a windrower including a rigid generally rectangular windrower frame, a normally horizontally disposed mower elongated in a direction transversely of the direction of travel of said frame structure and mounted on the forward edge of said windrower frame, and an endless belt conveyor disposed rearwardly of and generally parallel to said mower for receiving cut material from said mower and delivering material in a direction longitudinally of said mower and depositing said material on the ground in a windrow, said frame and belt sloping rearwardly and upwardly from said mower, a pair of mounting arms pivotally connected at one end to said windrower frame on a common axis extending longitudinally of said frame and near the forward edge of said frame, the other ends of said arms being pivotally connected to said frame structure on a common horizontal axis normally generally parallel to the pivot axis of said one end thereof, said arms being disposed adjacent opposite end portions of said windrower frame, a rigid link having a universal connection at one end to said frame structure and a second universal connection at its other end to the upper rear edge portion of said windrower frame generally centrally of the opposite ends of said windrower frame, whereby each end portion of said windrower is movable in a generally vertical direction independently of the opposite end thereof and relative to the axis of said wheels, counterbalancing means carried by said frame structure and operatively connected to said windrower for floatingly supporting said windrower, and means operatively connected to said windrower and said frame structure for bodily raising and lowering said windrower relative to said wheels while permitting said independent generally vertical movements of the opposite end portions of said windrower.

8. The structure defined in claim 7 in which said means for bodily raising and lowering said windrower comprises a pair of fluid pressure cylinder elements and cooperating extensible and retractable piston plunger elements, one of each pair of said elements being pivotally connected to a different one of said arms in closely spaced relation to the pivotal connection of said arms to said frame structure, the other of each pair of elements being operatively pivotally connected to said windrower adjacent the upper rear edge portion thereof, and conduit means providing communication between said cylinder elements and a source of fluid pressure and providing direct communication between said cylinder elements.

References Cited in the file of this patent

UNITED STATES PATENTS

| | | |
|---|---|---|
| 2,472,762 | Sage | June 7, 1949 |
| 2,510,245 | Munter | June 6, 1950 |
| 2,513,111 | Schiller | June 27, 1950 |
| 2,677,225 | Ommodt | May 4, 1954 |
| 2,780,903 | Kroll et al. | Feb. 12, 1957 |
| 2,801,511 | Vogelaar | Aug. 6, 1957 |
| 2,817,943 | Collins | Dec. 31, 1957 |
| 2,947,134 | Clifford et al. | Aug. 2, 1960 |
| 2,989,829 | Heth et al. | June 27, 1961 |